3,817,726
**PROCESS FOR CRACKING OR STEAM REFORM-
ING HYDROCARBONS USING AN ALKALI
POLYALUMINATE CATALYST**
Goro Yamaguchi, 1554 Tsuda-machi, Kodaira-shi, Tokyo,
  Japan; and Susumu Komatsu, 1099 Uraimbe, Bizen-cho,
  Wake-gun; Kazuhiro Yoshizaki, 98 Uraimbe, Bizen-cho,
  Wake-gun; and Tetsuo Fukumoto, 783 Uraimbe, Bizen-
  cho, Wake-gun, all of Okayama, Japan
Original application Apr. 1, 1970, Ser. No. 24,543, now
  Patent No. 3,694,379, dated Sept. 26, 1972. Divided
  and this application June 29, 1972, Ser. No. 267,614
Claims priority, application Japan, Aug. 28, 1969,
  44/67,562
Int. Cl. C01b 2/14
U.S. Cl. 48—214                    12 Claims

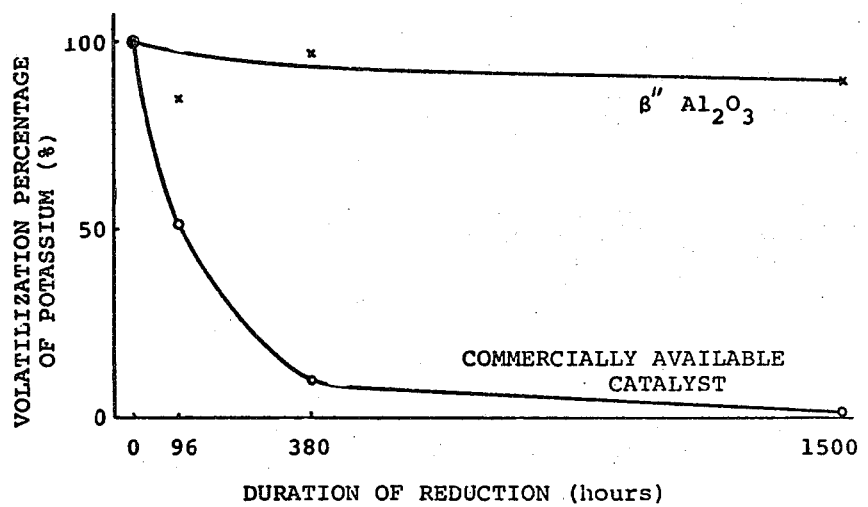

ABSTRACT OF THE DISCLOSURE

A catalyst for catalytic cracking or steam reforming of hydrocarbons and the process for producing the same, in which said catalyst being of alkali polyaluminates, or 2% or more of alkali polyaluminates supported on refractory carrier, or the above-mentioned catalysts which are added with 0.5% or more of chrome or a metal selected from Group VIII of the Periodic Table, or a mixture thereof.

---

This is a division of application Ser. No. 24,543, filed Apr. 1, 1970 now Pat. No. 3,694,379.

This invention relates to a catalyst composition for catalytic cracking or steam reforming of hydrocarbons, consisting of one member selected from the group of alkali polyaluminates ($\beta$-alumina; or $R_2O \cdot 11Al_2O_3$: $\beta'$-alumina; or $R_2O \cdot 7{-}8Al_2O_3$: $\beta''$-alumina; or $R_2O \cdot 5{-}6Al_2O_3$: (wherein R is Na or K)), or a catalyst being supported on refractory carrier containing at least 2% by weight of an alkali polyaluminate, calculated as an alkali metallic oxide, and it also relates to a process for producing the same. Further, it relates to a catalyst composition for catalytic cracking and steam reforming of hydrocarbons, the catalyst being supported on refractory carrier, characterized in that it is prepared by adding at least 0.5% of chrome or a metal selected from Group VIII of the Periodic Table or a mixture thereof, calculated as an oxide, to one member selected from the group of alkali polyaluminates or other refractory carrier material incorporated with at least 1.0% of an alkali polyaluminate, calculated as an alkali metallic oxide, and it also relates to a process for producing the same.

Generally, when hydrocarbons are subjected to catalytic cracking or steam reforming over catalysts, catalysts will maintain their activity for a short time and allow carbon to deposit easily thereon thereby necessitating repeated regeneration of catalysts by burning out the carbon deposited on the deactivated catalyst. This regeneration process of catalysts not only makes the operation of a reaction furnace complicated but also is time-consuming and inefficient. If this regeneration is neglected or the operation of the furnace is continued by using insufficiently regenerated catalysts, carbon will be deposited in pores of catalysts, thereby destroying the structure thereof in such a way as to weaken the bond among the constituents thereof, possibly resulting in the collapse of a part or all of constituents.

This is reported to be due to the reaction of aromatic substances, which are intermediate products obtained by the decomposition of hydrocarbons, at the acidic point of the catalysts. In particular, even catalysts, which consists only of nickel and alumina and are free of acidic substances such as $SiO_2$ and the like, will be unable to prevent the deposition of carbon thereon if used for a long time, because of the presence of acidic point of Lewis acid, a non proton acid, in the alumina ($Al_2O_3$).

In an attempt to overcome such disadvantages, improvements in catalysts composition have been proposed and practically made, one of the improvements being such as the addition of the chromate or dichromate of an alkali metal or alkali metallic salt such as carbonate to the catalysts to neutralize the acidic point thereof (Japanese Patent Gazette of Publication No. Sho 40 26,413). However, the catalysts incorporated with said additive have been proved to have a shorter catalytic life because, when used, they are exposed to high temperatures under a reducing atmosphere whereby the alkali metal present in the additive is gradually volatilized in such a manner that an approximate half of the amount of the alkali metal is lost by volatilization after one-year use of the catalysts.

Various studies were made by the inventors, with the object of allowing the catalysts to contain an alkali metal in an amount enough to keep them neutral and in the nonvolatile form during their use. As a result of the studies, it has been found that the object is satisfactorily achieved by the addition of the polyaluminate of an alkali to the catalysts.

$\beta$-$Al_2O_3$, which is a mineral having the composition of $R_2O \cdot 11Al_2O_3$ (wherein R is Na or K), has been known as one of the conventional alkali polyaluminates; and the existence of two new alkali polyaluminates, these being $\beta'$-alumina and $\beta''$-alumina respectively having the composition of $R_2O \cdot 7{-}8Al_2O_3$ and $R_2O \cdot 5{-}6Al_2O_3$ (wherein R is K or Na), which have a higher content of an alkali metal, has been found by Yamaguchi and others who are among the inventors (refer to Bulletin of the Chemical Society of Japan, vol. 41, No. 1, pp. 93–99 (1968)). The term "alkali polyaluminates" used herein designates sodium and potassium polyaluminates in which both said conventional and new polyaluminates are included. These minerals will decompose at a low rate even when exposed to a high-temperature reducing atmosphere for a long time, whereby the alkali metal present in the minerals is difficult to volatilize and consequently hardly decreases in amount.

The accompanying drawing shows the results of a test in which a potassium polyaluminate ($\beta''$-$Al_2O_3$ containing 12.01% of $K_2O$) and commercially available nickel catalyst incorporated with potassium salt (containing 8.12% of $K_2O$) were heated in the hydrogen flow at a temperature of 1000° C. for 1500 hours in order to study how the potassiums present therein volatilize during heating.

It has been found that the alkali present in said alkali polyaluminate is volitalized at a considerably lower rate than the one present in commercially available catalysts. Therefore, such an alkali polyaluminate, when used as a catalyst, will serve to keep the catalyst neutral for a longer time and will be remarkably effective in inhibiting the deposition of carbonaceous substances on the catalyst due to the fact that a portion of the alkali metal moves within the catalyst thereby combining principally with the acidic point of the catalyst.

When hydrocarbons are subjected to catalytic cracking in the presence of steam by using a catalyst containing said alkali polyaluminate or a catalyst prepared by adding at least 2% of an alkali polyaluminate, calculated as an alkali metallic oxide ($Na_2O$ or $K_2O$), to other refractory carrier, oxidation reaction, i.e., water gas reaction is especially promoted. Therefore, the amount of carbon to be deposited on the catalyst is very small. Formation of tar is also negligible. Thus, a gas having a high content of hydrogen ($H_2$) and consisting of methane ($CH_4$), ethylene ($C_2H_4$), carbon dioxide ($CO_2$) and a small amount of carbon monoxide (CO) is obtained. This gas decomposes to such an extent where other heavy hydrocarbons are hardly noticed. It has been found that town gas having an ideally high calorific value can be produced in this way at an extremely low cost.

In catalytic cracking of hydrocarbons having 5 to 6 carbon, such as naphtha or the like, the space velocity of liquid should be preferably low, that is, approximately 1, if it is desired to produce town gas. A highly combustible and safe gas having a calorific value of as high as 6000 kcal./$Nm.^3$ and containing hydrogen ($H_2$), methane ($CH_4$), etc. in a great quantity and being free from carbon monoxide (CO) can be produced at a reaction temperature of 800° C. On the other hand, in producing ethylene ($C_2H_4$), the space velocity of liquid should be preferably higher, that is, about 5–10, whereby a gas having a good yield of ethylene can be produced.

Another important characteristic of this catalyst is that it has the quite same effect as stated above in catalytically cracking heavy hydrocarbons of crude oil and the like thereby producing a gas having a calorific value of as high as 6000–7000 kcal./$Nm.^3$ and being free of hydrocarbons above propylene.

Steam reforming reaction of hydrocarbons is remarkably promoted by adding at least 0.5% of chrome oxide and a metallic oxide of Group VIII of the Periodic Table to a catalyst containing an alkali polyaluminate or a catalyst prepared by incorporating at least 1.0% of alkali polyaluminate, calculated as an alkali metallic oxide ($Na_2O$ or $K_2O$), to other refractory carrier material. A gas that has reached equilibrium is produced at a temperature of about 400° C. and above, whereby a quite active catalyst can be obtained. When it is desired to produce methane ($CH_4$) in a great quantity at a high pressure and low temperature or when it is desired to produce hydrogen ($H_2$) continuously in a great quantity at a high pressure and high temperature, the catalytic metal oxide should be added in a comparatively great quantity, that is, for more than 10%. Since such a catalyst can produce a gas composition that has reached equilibrium in accordance with the reaction pressure, reaction temperature, steam-to-carbon ratio, amount of carbon and hydrogen present in the material hydrocarbon and etc., it is possible to change the composition of a gas freely and easily in a wide range in accordance with the requirements.

In case when sulfur compounds are present in a material hydrocarbon, a catalyst may be preferably used at a reaction temperature of 750°–800° C. which contains an alkali polyaluminate or is prepared by adding at least 1% of alkali polyaluminate, calculated as an alkali metallic oxide, to a refractory carrier, or which is prepared by adding a comparatively small amount, that is, 0.5–2.0%, of chrome oxide or a metallic oxide of Group VIII of the Periodic Table or a mixture thereof to said catalyst. If such a catalyst is used, catalytic cracking and steam reforming reaction can be proceeded without being poisoned by sulfur. In this case, catalytic cracking may be performed over the former alkali polyaluminate which does not contain any metal in order to produce a gas having a calorific value of more than 6000 kcal./$Nm.^3$. For production of a gas having a calorific value of about 4000 kcal./$Nm.^3$, the latter catalyst containing about 0.5–2.0% of metals is more suitable.

Catalysts can be prepared by any one of the following processes comprising;

(1) adding a suitable bonding agent to an alkali polyaluminate in powder form and then molding the resulting mixture into tablets, pieces having Raschig ring-like shape or other suitable shapes, or sintering said mixture by firing;
(2) mixing a refractory carrier material with a finely powdered alkali polyaluminate so as to contain alkali metal in an appropriate quantity and then molding the resulting mixture into a suitable shape by use of a suitable bonding agent, or sintering said mixture by firing;
(3) adding one member selected from the group of alkali polyaluminates in powdered form to a solution of chrome or a metallic salt of Group VIII of the Periodic Table to precipitate metals, filtering the resulting slurried mixture, after agitation, with subsequent washing and then molding said mixture into a suitable shape by use of a bonding agent;
(4) impregnating a sintered alkali polyaluminate or a sintered mixture of an alkali polyaluminate and a refractory carrier material of an appropriate shape into a solution of chrome or a metallic salt of Group VIII of the Periodic Table and then heating the resulting mixture at a temperature of about 600° C.;
(5) mixing chrome or a metallic salt of Group VIII of the Periodic Table with a finely powdered member of the group of alkali polyaluminates or a refractory carrier material containing an appropriate amount of any one of alkali polyaluminates, and then molding the resulting mixture by use of a suitable bonding agent, or sintering said mixture by firing.

Refractory materials which may preferably be used as carriers for the catalyst include, neutral or basic oxides (such as $Al_2O_3$, $Cr_2O_3$, CaO, MgO and the like), or a mixture thereof. As such carriers, there may also be used acidic oxides (such as $SiO_2$, $TiO_2$, $ZrO_2$ and the like) or a mixture thereof, as well as other refractory oxide materials including a mixture of neutral, basic and acidic oxides or a sintered mixture thereof (such as $$3Al_2O_3 \cdot 2SiO_2$$

and the like). The alkali polyaluminate, if added in an amount of 1.0% and more, calculated as alkali metal oxide, will be satisfactorily effective in inhibiting the deposition of carbon when a neutral or basic oxide material is used as a carrier, while the alkali polyaluminate will have to be increased in amount in proportion to the amount of acidic oxide when acidic oxide ($SiO_2$) such as alumina-silicates and the like are included in the carrier. In this connection, the $\beta$- or $\beta'$-alkali polyaluminate should preferably be added in an amount at least 2.5 times that of the acidic oxides contained in the catalyst composition in order to obtain the maximum inhibiting effect on the deposition of carbon on the catalyst composition. It is thus advisable that the catalyst composition should contain alkali-richer $\beta''$-alkali polyaluminate if it also contains acidic oxides in an amount of 20% or more (in this case, the amount of the alkali polyaluminate added being at least twice as large as the acidic oxides contained.).

This invention will be better understood by the following examples.

EXAMPLE 1

A potassium polyaluminate ($\beta''$-$Al_2O_3$) prepared by mixing 6 molecular weight aluminum hydroxide and 1 molecular weight potassium carbonate and then firing the resulting mixture at a temperature of 1400° C., is pulverized, to which CMC solution of 1.8% in concentration is added in the amount of 13%. The mixture thus obtained, after being kneaded, is molded into tablets of 10 mm. in diameter and 7 mm. in height, which is then fired at a temperature of 1500° C. The catalyst thus obtained has the following chemical composition and physical properties.

Shown in the following table are the results of a test in which said catalyst composition was used in 24-hour continuous catalytic cracking of naphtha, whose boiling point range is from 30° C. to 88° C., specific gravity is 0.6455 ($d_4^{15}$) and sulfur content is 130 p.p.m.

For the purpose of comparison, the results of a test in which $Al_2O_3$ was used as a heat medium under the same condition are shown below.

Chemical composition of catalyst (percent):

$Al_2O_3$ _____ 89.85
$K_2O$ _____ 10.15

Physical properties of catalyst:

Porosity, percent _____ 41.8
Rate of water absorption, percent _____ 22.4
Bulk density _____ 1.87
Compression strength, kg./cm.² _____ 570
Abrasion rate, percent _____ 3.5

Chemical composition of catalyst (percent):

$SiO_2$ _____ 1.1
$Al_2O_3$ _____ 44.3
$Fe_2O_3$ _____ 0.1
$CaO$ _____ 0.5
$MgO$ _____ 48.1
$K_2O$ _____ 5.9

RULES OF CATALYTIC CRACKING

| Operation hour | 10 hours | 820 hours | 1,200 hours | 1,440 hours | 1,750 hours |
|---|---|---|---|---|---|
| Reaction temp., ° C | 800 | 796 | 810 | 800 | 793 |
| Steam-to-carbon ratio, kg./l | 1.201 | 796 | 810 | 800 | 793 |
| Space velocity | 1.0 | 796 | 810 | 800 | 793 |
| Composition of gaseous mixture produced, percent: | | | | | |
| $CO_2$ | 12.33 | 10.66 | 10.30 | 9.99 | 10.13 |
| $CO$ | 4.51 | 4.88 | 4.55 | 3.35 | 2.68 |
| $CH_4$ | 17.73 | 19.33 | 19.97 | 21.14 | 22.25 |
| $C_2H_6$ | 1.08 | 1.18 | 1.18 | 1.15 | 1.01 |
| $C_2H_4$ | 12.52 | 14.17 | 15.19 | 16.68 | 17.72 |
| $C_3H_6$ | 0.39 | 0.85 | 1.14 | 0.98 | 0.97 |
| 1,3-$C_4H_6$ | | | 0.17 | | |
| $H_2$ | 47.50 | 46.48 | 44.17 | 45.17 | 44.60 |
| $N_2$ | 0.19 | | 0.12 | | 0.16 |
| $O_2$ | | | | | |
| Amount of gas produced, m.³/kl | 1,205 | 1,253 | 1,242 | 1,268 | 1,260 |
| Calorific value, kcal./m.³ | 6,230 | 6,725 | 6,855 | 7,092 | 7,315 |
| Efficiency of gasification, percent | 101.0 | 112.5 | 114.6 | 120.1 | 124.9 |

EXAMPLE 3

$\beta$-$Al_2O_3$ ($Na_2O \cdot 11Al_2O_3$), fused alumina abrasive, in fine powders is mixed with alumina cement at the ratio of 70 to 30 by part which are then formed into pellets

RESULTS OF CATALYTIC CRACKING

| | 1 hour | | | | 20 hours | | | |
|---|---|---|---|---|---|---|---|---|
| | Catalyst of this invention | | Heat medium $Al_2O_3$ | | Catalyst of this invention | | Heat medium $Al_2O_3$ | |
| Reaction temp., ° C | 750 | 800 | 750 | 800 | 750 | 800 | 750 | 800 |
| Steam-to-carbon ratio, kg./l | 1.516 | 800 | 750 | 800 | 750 | 800 | 750 | 800 |
| Space velocity | 1.0 | 800 | 750 | 800 | 750 | 800 | 750 | 800 |
| Composition of gaseous mixture produced, percent: | | | | | | | | |
| $CO_2$ | 9.93 | 12.12 | 2.13 | 3.78 | 7.45 | 10.68 | 1.07 | 2.68 |
| $CO$ | 1.10 | 4.70 | 1.41 | 1.21 | 1.05 | 2.99 | 0.72 | 1.48 |
| $CH_4$ | 19.69 | 18.01 | 31.53 | 31.92 | 23.93 | 20.39 | 33.04 | 33.66 |
| $C_2H_6$ | 1.35 | 1.10 | 2.68 | 1.17 | 1.46 | 0.98 | 3.38 | 1.31 |
| $C_2H_4$ | 17.82 | 12.71 | 27.10 | 20.35 | 20.99 | 15.78 | 27.85 | 22.15 |
| $C_3H_6$ | 2.77 | 0.48 | 6.73 | 0.80 | 4.09 | 0.83 | 7.37 | 1.12 |
| n-$C_4H_{10}$ | | | 0.08 | | | | 0.23 | |
| 1-$C_4H_8$ | | | 0.26 | | | | 0.19 | |
| Iso-$C_4H_8$ | 0.24 | | 0.77 | | 0.34 | | 0.41 | |
| Tr-2-$C_4H_8$ | | | 0.11 | | | | 0.16 | |
| 1-3-$C_4H_6$ | 0.39 | | 1.18 | | 0.55 | | 1.38 | |
| Iso-$C_5H_{12}$ | | | 0.19 | | | | 0.38 | 0.40 |
| n-$C_5H_{12}$ | | | 0.32 | 0.18 | | | 0.46 | 0.32 |
| $H_2$ | 40.32 | 49.11 | 23.58 | 38.13 | 37.00 | 47.23 | 20.22 | 34.61 |
| $N_2$ | 1.25 | 0.20 | 0.47 | | 0.21 | 0.09 | 0.16 | |
| $O_2$ | | | 0.12 | | | | | |
| Amount of gas produced, m.³/kl | 1,050 | 1,375 | 618 | 698 | 992 | 1,335 | 536 | 607 |
| Calorific value, kcal./m.³ | 6,916 | 5,574 | 10,722 | 8,701 | 8,186 | 6,173 | 11,258 | 8,366 |
| Efficiency of gasification, percent | 98.3 | 103.2 | 89.5 | 82.4 | 109.8 | 111.5 | 81.2 | 68.5 |
| Carbon deposited/carbon in crude oil, percent | | | | | 0.75 | 0.84 | 2.37 | 4.99 |

In case when a catalyst of the present invention was used, formation of tar was not noticed at all during operation. On the other hand, when alumina was used as a heat medium, pasty tar was formed in a considerable amount.

EXAMPLE 2

50 parts of potassium polyaluminate ($\beta'$-$Al_2O_3$) prepared in the same way as Example 1 and 50 parts magnesium oxide (MgO) are mixed, to which CMC solution of 18% in concentration is incorporated in the amount of about 12%. The resulting mixture, after being kneaded, is molded into pieces having Rashig ring-like shape of 20 mm. in outer diameter, 6 mm. in inner diameter and 20 mm. in height, which are then fired at a temperature of 1500° C. The catalyst thus obtained was used in a test wherein the naphtha used in Example 1 was subjected to catalytic cracking for 1750 hours according to the cyclic system comprising 16 minute cycles.

having a diameter of 20 mm. to produce a catalyst. The catalytic cracking was performed by use of the catalyst thus obtained in the same way as Example 1. The results of this cracking were quite the same as those shown in Example 1.

The chemical composition (percent) of this catalyst is as follows.

Ig. loss _____ 3.00
$SiO_2$ _____ 0.07
$Al_2O_3$ _____ 81.77
$Fe_2O_3$ _____ 0.02
$CaO$ _____ 9.11
$MgO$ _____ Trace
$Na_2O$ _____ 0.05

EXAMPLE 4

The powder of $\beta''$-$Al_2O_3$ ($K_2O \cdot 5$-$6Al_2O_3$) prepared by mixing aluminum hydroxide with potassium carbonate at the same ratio and firing the resulting mixture at a temperature of 1380° C. is formed into tablets of 10 mm. in diameter and 6 mm. in height, and is subjected to firing at a temperature of 1500° C. to produce a catalyst. The chemical composition (percent) of the catalyst thus obtained is as follows.

The naphtha of Example 1 was subjected to catalytic cracking at a space velocity of 5 to 10 by using the catalyst thus obtained, as a result of which a gas rich in ethylene ($C_2H_4$) and having the following composition was produced.

Chemical composition of catalyst $Al_2O_3$ ---------------------------------------- 86.55
$K_2O$ ------------------------------------------ 13.45

RESULTS OF CATALYTIC CRACKING

| Reaction temp., ° C | 700 | 700 | 750 |
|---|---|---|---|
| Space velocity | 5 | 10 | 5 |
| Steam-to-carbon ratio, kg./l | 1.0 | 1.0 | 1.0 |
| Composition of gaseous mixture produced, percent: | | | |
| $CO_2$ | 1.41 | 0.24 | 0.84 |
| CO | 0.50 | 0.48 | 1.63 |
| $CH_4$ | 27.34 | 28.19 | 34.38 |
| $C_2H_6$ | 1.79 | 1.32 | 0.81 |
| $C_2H_4$ | 34.75 | 36.72 | 32.39 |
| $C_3H_6$ | 8.94 | 9.74 | 2.68 |
| Cyclo-$C_3H_8$ | 0.39 | 0.70 | |
| 1-$C_4H_8$ | 0.62 | 0.71 | |
| Iso-$C_4H_8$ | 1.13 | 1.10 | |
| Tr-2-$C_4H_8$ | 0.10 | 0.15 | |
| 1,3-$C_4H_6$ | 1.75 | 2.11 | 0.95 |
| Iso-$C_5H_{12}$ | 0.49 | 0.64 | |
| n-$C_5H_{12}$ | 1.10 | 1.02 | |
| $H_2$ | 18.98 | 15.31 | 26.16 |
| $N_2$ | 0.41 | | |
| $O_2$ | | | |
| Amount of gas produced, m.³/kl | 828 | 701 | 1,067 |
| Calorific value, kcal./m.³ | 12,533 | 13,218 | 10,073 |
| Efficiency of gasification, percent | 122.0 | 110.0 | 127.8 |
| Carbon deposited/carbon in naphtha, percent | 0.92 | 1.10 | 0.87 |

EXAMPLE 5

A crude oil having a specific gravity of 0.858 (15°/4°), calorific value of 10870 kcal./kg. and containing 86.0% of carbon and 13.5% of hydrogen, was catalytically cracked by using the catalyst of Example 1 according to the cyclic system comprising 10 minute cycles, the result of which are shown below.

RESULTS OF CATALYTIC CRACKING

| Reaction temp., ° C | 750 | 800 |
|---|---|---|
| Steam-to-carbon ratio, kg./l | 1.03 | 800 |
| Space velocity | 0.66 | 800 |
| Composition of gaseous mixture produced, percent: | | |
| $CO_2$ | 6.47 | 11.70 |
| CO | 1.43 | 2.46 |
| $CH_4$ | 24.07 | 24.27 |
| $C_2H_6$ | 1.89 | 1.47 |
| $C_2H_4$ | 13.72 | 12.53 |
| $C_3H_6$ | 5.33 | 4.15 |
| $C_3H_8$ | 0.11 | |
| n-$C_4H_{10}$ | | |
| Other $C_4$ hydrocarbons | 2.39 | |
| $H_2$ | 40.56 | 40.08 |
| $N_2$ | 3.58 | 2.95 |
| $O_2$ | 0.45 | 0.37 |
| Amount of gas produced, m.³/kl | 942 | 1232 |
| Calorific value, kcal./m.³ | 8473 | 6755 |
| Heat produced, JHU/kl | 798 | 832 |
| Efficiency of gasification, percent | 74.5 | 89.2 |

EXAMPLE 6

$\beta'$-Potassium-polyaluminate prepared by mixing aluminum hydroxide with potassium carbonate at the ratio of 3 to 1 and firing the resulting mixture at a temperature of 1400° C. is finely powdered and molded into pieces having Raschig ring-like shape of 17 mm. in outer diameter, 5 mm. in inner diameter and 17 mm. in height which are then fired at a temperature of 1500° C. to produce a carrier material. The carrier material is dipped in a solution of nickel nitrate to allow the material to hold therein nickel nitrate in an amount of more than 10%, calculated as NiO, and then fired at a temperature of approximately 500° C. to obtain the catalyst of $\beta'$-potassium polyaluminate-nickel, having the following chemical composition (percent):

$Al_2O_3$ ---------------------------------------- 81.45
$K_2O$ ------------------------------------------ 8.47
NiO -------------------------------------------- 10.08

This catalyst composition was used in a test in which naphtha of specific gravity of 0.6574 ($d_0^{15}$) was subjected to steam reforming at a low temperature and atmospheric pressure, and the test results are shown in the following table from which it is seen that the gas composition almost reached its equilibrium.

| Reaction temp., ° C | 500 | 550 | 600 |
|---|---|---|---|
| Space velocity, hr | 0.5 | 0.5 | 0.5 |
| Steam-to-carbon ratio, $H_2O$ mol/C mol | 1.2 | 1.2 | 1.2 |
| Amount of gas produced, Nm.³/kl | 1,469 | 1,879 | 2,214 |
| Calorific value, kcal./Nm.³ | 5,716 | 4,174 | 3,661 |
| Efficiency of gasification, percent | 111.0 | 103.0 | 107.2 |
| Composition of gaseous mixture produced, percent: | | | |
| $CO_2$ | 14.28 | 13.23 | 10.23 |
| CO | 3.82 | 10.84 | 14.61 |
| $CH_4$ | 40.35 | 23.76 | 14.54 |
| $H_2$ | 40.86 | 51.83 | 60.12 |

EXAMPLE 7

A $\beta'$-potassium polyaluminate ($K_2O \cdot 7-22Al_2O_3$) prepared by mixing potassium carbonate and aluminum hydroxide at the ratio of 1 to 3 and then firing the resulting mixture at a temperature of 1400° C., is added in fine powder form to a mixture of magnesium carbonate and aluminum hydroxide. The thus-obtained mixture, after mixed, is incorporated with a solution of nickel nitrate, agitated and then incorporated with sodium carbonate to precipitate nickel carbonate with the mixture. The slurried mixture so obtained is thoroughly agitated and mixed, filtered and then washed and dried to obtain solid substances which are subsequently fired at a temperature of 400° C. to convert the nickel carbonate therein to nickel oxide. The thus-fired substances are pulverized, blended with alumina cement and molded into pellets which are then heated at a temperature of 250° C. in steam to produce the desired catalyst composition in the pellet form. The chemical composition (percent) of the catalyst composition so produced is compared with that of the conventional commercially available catalyst composition (percent), as shown below.

| | Ignition loss | $SiO_2$ | $Fe_2O_3$ | $Al_2O_3$ | CaO | MgO | NiO | $K_2O$ |
|---|---|---|---|---|---|---|---|---|
| Catalyst composition of this invention | 8.05 | 0.09 | 0.04 | 63.99 | 7.99 | 3.17 | 11.66 | 5.01 |
| Conventional commercially available catalyst composition | 11.74 | 12.77 | 1.14 | 33.97 | 9.94 | 7.93 | 16.66 | 5.85 |

In the following table, there are shown comparative data obtained at the initial stage of the operation in which these catalyst compositions were used in the continuous steam reforming of naphtha, whose boiling point range is from 40° C. to 170° C., specific gravity is $d_0^{15}=0.71$, at a pressure of 20 atm. for 24 hours.

| | Commercially available catalyst | | | Catalyst of this invention | | |
|---|---|---|---|---|---|---|
| Reaction temp., ° C | 700 | 750 | 800 | 700 | 750 | 800 |
| Space velocity (vol./vol./hr.) | 1.0 | 750 | 800 | 700 | 750 | 800 |
| Steam-to-carbon ratio ($H_2O$ mol/C mol) | 3.38 | 750 | 800 | 700 | 750 | 800 |
| Amount of gases produced, Nm.$^3$/kl | 2,985 | 3,311 | 3,585 | 3,186 | 3,380 | 3,720 |
| Efficiency of gasification, kcal./kcal | 122 | 123 | 128 | 123 | 125 | 129 |
| Amount of carbon deposited, percent | 1.2 | 1.1 | 0.1 | 0.4 | 0.3 | Tr. |
| Composition of gaseous mixture produced (vol. percent): | | | | | | |
| $CO_2$ | 16.07 | 15.77 | 15.55 | 17.14 | 17.36 | 15.28 |
| CO | 7.89 | 8.93 | 10.92 | 7.07 | 8.03 | 9.79 |
| $CH_4$ | 11.32 | 7.21 | 4.18 | 9.49 | 6.81 | 3.54 |
| $H_2$ | 65.43 | 68.88 | 71.20 | 66.00 | 67.60 | 71.71 |

This catalyst composition of this invention, which was charged into a tubular reactor of 4 inches in inner diameter and 19 feet in length, could be used as such for 4500 hours without lowering its catalytic activity. The used catalyst composition withdrawn from the tubular reactor has the following chemical composition which shows that it extremely slightly decrease in amount of potassium oxide as compared with the conventional ones. In the conventional catalyst, pulverization of catalyst in the lower portion of catalyst zone due to deposition of carbon was noticed in a considerable amount. This phenomenon, however, was not noticed at all in the catalyst of the present invention.

| | Ignition loss | $SiO_2$ | $Fe_2P_3$ | $Al_2O_3$ | CaO | MgO | NiO | $K_2O$ |
|---|---|---|---|---|---|---|---|---|
| Catalyst composition of this invention | Tr. | 0.10 | 0.04 | 69.75 | 8.69 | 3.46 | 12.70 | 5.26 |
| Conventional commercially available catalyst composition | Tr. | 15.01 | 1.34 | 40.12 | 11.70 | 9.35 | 19.44 | 3.04 |

EXAMPLE 8

$\beta$-$Al_2O_3$ ($Na_2O \cdot 11Al_2O_3$), fused alumina abrasive, is pulverized, formed into pellets and then fired at a temperature of 1400° C. to produce a carrier material. The carrier material is dipped in a nickel nitrate solution the concentration of which is adjusted to allow the carrier material to adsorb the nickel salt in an amount of 5 weight percent calculated as nickel oxide, thereafter withdrawn from the solution and then fired at a temperature of approximately 400° C. thereby removing gaseous nitric acid to produce a desired catalyst composition which has the following chemical composition (percent).

| | |
|---|---|
| Ignition loss | Trace |
| $SiO_2$ | 0.10 |
| $Fe_2O_3$ | 0.03 |
| $Al_2O_3$ | 87.25 |
| CaO | 0.01 |
| MgO | Trace |
| NiO | 5.40 |
| $Na_2O$ | 7.21 |

The catalyst composition showed approximately the same high activity in a laboratory-scale test as that obtained in Example 7, and on the other hand it allowed carbon to deposit thereon in a small amount when put to a prolonged use (about 1000-hour use) in a pilot plant-scale test. As its characteristic, however, it could easily be regenerated without damaging it because it was strong in structure and the carbon deposited thereon could readily be blown off by use of an inert gas such as $N_2$ gas or the like.

EXAMPLE 9

$\beta''$-Potassium polyaluminate (this being prepared by mixing aluminium hydroxide and potassium carbonate at the ratio of 1:1, firing the resulting mixture at a temperature of 1300° C. to diffuse a considerable part of the amount of the potassium, and then washing away soluble potassium of free form the fired mixture) is added in fine powder form to a kaolinite clay at the ratio of 1:1. The thus obtained mixture is incorporated with a solution of nickel nitrate and then mixed with each other. The resulting mixture is incorporated with sodium carbonate thereby precipitating nickel carbonate within the mixture. The slurried or pasty mixture so obtained is mixed thoroughly under agitation, thereafter filtered and then washed with water to produce solid substances which are subsequently dried and fired at a temperature of 400° C. to convert the nickel carbonate to nickel oxide. These fired substances are pulverized and formed into pellets having the following chemical composition (percent).

| | |
|---|---|
| Ignition loss | 7.62 |
| $SiO_2$ | 21.19 |
| $Fe_2O_3$ | 0.01 |
| $Al_2O_3$ | 57.28 |
| CaO | 0.04 |
| MgO | 0.01 |
| NiO | 7.02 |
| $K_2O$ | 6.83 |

These pellets showed quite the same results as those shown in Example 7 when subjected to the same test as Example 7.

EXAMPLE 10

The catalyst of potassium polyaluminate ($\beta'$-$Al_2O_3$) used in Example 1 is dipped into a solution of cobalt nitrate, incorporated with 1% and 0.5% of CoO and then heated at a temperature of 600° C. to remove nitric gas.

The catalyst thus obtained was used in the catalytic cracking of the naphtha of Example 1, the results of which are as follows.

| Catalyst | $\beta'$-$Al_2O_3$ incorporated with 1.0% of CoO | | $\beta'$-$Al_2O_3$ incorporated with 0.5% of CoO | |
|---|---|---|---|---|
| Reaction temp., ° C | 750 | 800 | 750 | 800 |
| Steam-to carbon ratio, kg./l | 1.01 | 800 | 750 | 800 |
| Space velocity | 1.08 | 800 | 750 | 800 |
| Composition of gaseous mixture produced, percent: | | | | |
| $CO_2$ | 8.35 | 7.20 | 7.49 | 7.70 |
| CO | 14.73 | 19.60 | 5.90 | 15.70 |
| $CH_4$ | 10.11 | 6.93 | 16.75 | 11.40 |
| $C_2H_6$ | 1.11 | 0.80 | 1.85 | 1.51 |
| $C_2H_4$ | 5.38 | 3.70 | 18.81 | 10.74 |
| $C_3H_8$ | | | | |
| $C_3H_6$ | 4.30 | 0.65 | 6.12 | 1.03 |
| Other $C_4$ hydrocarbons | 1.00 | | 5.20 | |
| $H_2$ | 55.30 | 60.25 | 37.90 | 51.80 |
| $N_2$ | | | | |
| $O_2$ | | | | |
| Amount of gas produced, m.$^3$/kl | 1,480 | 2,185 | 830 | 1,630 |
| Calorific value, kcal./m$^3$ | 5,348 | 3,926 | 9,825 | 5,155 |
| Heat produced, JHU/kl | 790 | 857 | 816 | 842 |
| Efficiency of gasification, percent | 100.2 | 114.2 | 110.0 | 113.5 |

EXAMPLE 11

The catalyst of potassium polyaluminate ($\beta'$-$Al_2O_3$) used in Example 1 is dipped into a solution of chrome nitrate, incorporated with 1.0% of $Cr_2O_3$ and then heated at a temperature of 600° C. to remove nitric gas. The catalyst thus obtained was used in catalytic cracking of the naphtha of Example 1, the results of which are shown below.

| | | |
|---|---|---|
| Reaction temp., °C | 750 | 800 |
| Steam-to-carbon ratio, kg./l | 1.01 | 800 |
| Space velocity | 1.08 | 800 |
| Composition of gaseous mixture produced, percent: | | |
| $CO_2$ | 9.25 | 6.58 |
| CO | 9.36 | 20.50 |
| $CH_4$ | 11.76 | 7.53 |
| $C_2H_6$ | 2.12 | 1.06 |
| $C_2H_4$ | 11.64 | 4.04 |
| $C_3H_8$ | | |
| $C_3H_6$ | 3.39 | 0.44 |
| Other $C_4$ hydrocarbons | 3.30 | 0.51 |
| $H_2$ | 49.20 | 59.30 |
| $N_2$ | | |
| $O_2$ | | |
| Amount of gas produced, m.³/kl | 1,435 | 2,370 |
| Calorific value, kcal./m.³ | 6,250 | 3,750 |
| Heat produced, JHU/kl | 897 | 889 |
| Efficiency of gasification, percent | 116 | 161 |

What we claim is:

1. In a process for catalytic cracking of hydrocarbons, the improvement which comprises employing as a catalyst a composition comprising
   (a) at least 2% by weight, calculated as an alkali metal oxide, of at least one alkali polyaluminate selected from the group consisting of $\beta'$-alumina and $\beta''$-alumina, and
   (b) a different refractory catalyst carrier material.

2. In a process for steam reforming of hydrocarbons, the improvement which comprises employing as a catalytic composition a mixture consisting essentially of
   (a) at least 2% by weight, calculated as an alkali metal oxide, of at least one alkali polyaluminate selected from the group consisting of $\beta'$-alumina and $\beta''$-alumina, and
   (b) a different refractory catalyst carrier material.

3. In a process for steam reforming of hydrocarbons, the improvement comprising employing as a catalyst a composition comprising:
   (a) at least 0.5% by weight, calculated as an oxide, of at least one member selected from the group consisting of chrome oxide and an oxide of a metal of Group VIII of the Periodic Table, and
   (b) at least 1% by weight, calculated as an alkali metal oxide, of at least one alkali polyaluminate selected from the group consisting of $\beta'$-alumina and $\beta''$-alumina.

4. In a catalytic process for cracking or steam reforming of hydrocarbons, the improvement which comprises: using a substantially neutral catalyst consisting essentially of
   (a) at least about 1% of at least one alkali metal polyaluminate (based on weight of alkalimetal oxide) selected from the group consisting of $\beta'$-alumina and $\beta''$-alumina with at least 0.5% by weight of chrome oxide or Group VIII metal oxide, and
   (b) refractory catalyst carrier different from (a).

5. The process of claim 4 wherein material (a) is present in an amount sufficient to inhibit carbon deposition.

6. The process of claim 4 wherein the catalyst carrier comprises $Cr_2O_3$, CaO, MgO, $SiO_2$, $TiO_2$, $ZrO_2$, $Al_2O_3$ or $3Al_2O_3 \cdot 2SiO_2$.

7. The process of claim 4 wherein the alkali metal polyaluminate consists essentially of $R_2O \cdot 7-8Al_2O_3$, wherein R is Na or K.

8. The process of claim 4 wherein the alkali metal polyaluminate consists essentially of $R_2O \cdot 5-6Al_2O_3$, wherein R is Na or K.

9. The process of claim 4 wherein the catalyst comprises at least 5% by weight of $K_2O$.

10. The process of claim 4 wherein the catalyst comprises at least 5% by weight of $Na_2O$.

11. The process of claim 4 wherein said alkali polyaluminate is sintered and is impregnated with the 0.5% by weight chrome oxide or Group VIII metal oxide.

12. The process of claim 11 wherein the catalyst is formed as a fired, shaped article.

References Cited

UNITED STATES PATENTS 2,454,227  11/1948  Smith et al.  252—434

OTHER REFERENCES

On the Structure of Alkali Polyaluminates, Yamaguchi et al., Bulletin of Chem. Soc. of Japan (January 1968).

S. LEON BASHORE, Primary Examiner

R. PACE, Assistant Examiner

U.S. Cl. X.R.

48—197 B

UNITED STATES PATENT OFFICE
CERTIFICATE OF CORRECTION

Patent No. 3,817,726                      Dated     June 18, 1974

Inventor(s)     Goro Yamaguchi et al

It is certified that error appears in the above-identified patent and that said Letters Patent are hereby corrected as shown below:

Column 6, line 8, change "Rules" to --results--.

line 22, change "1260" to --1265--.

line 23, change "7313" to --7319--.

line 24, change "124.9" to --124.0--.

line 71, change "0.05" to --5.05--.

Column 9, line 15, change "15.55" to --14.55--.

Signed and sealed this 5th day of November 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,817,726  Dated June 18, 1974

Inventor(s) Goro Yamaguchi, et al.

It is certified that error appears in the above-identified patent and that said Letters Patent are hereby corrected as shown below:

Claim 11, lines 2-3, cancel "0.5% by weight"

Signed and sealed this 24th day of December 1974.

(SEAL)
Attest:

McCOY M. GIBSON JR.
Attesting Officer

C. MARSHALL DANN
Commissioner of Patents